Figure 5:
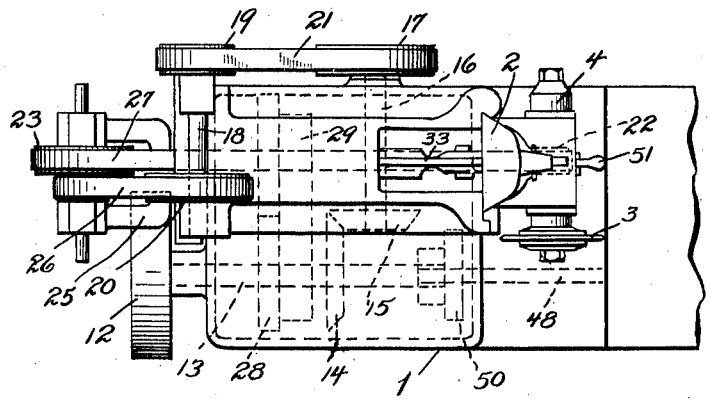

May 5, 1925.

J. P. KEMP 1,536,398

PROCESS OF DRESSING OR RE-FORMING GRINDING SURFACES

Filed April 21, 1921    2 Sheets-Sheet 1

Inventor:
Jabez P. Kemp.
By William W. Varney ATTORNEY.

May 5, 1925. 1,536,398
J. P. KEMP
PROCESS OF DRESSING OR RE-FORMING GRINDING SURFACES
Filed April 21, 1921 2 Sheets-Sheet 2
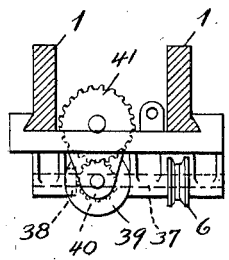
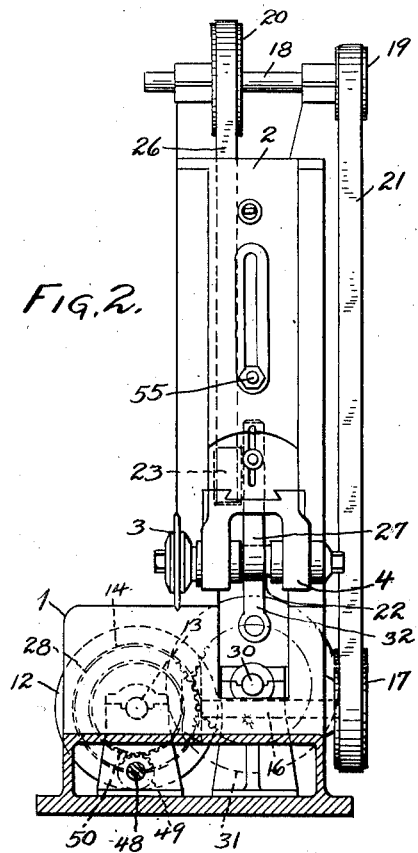
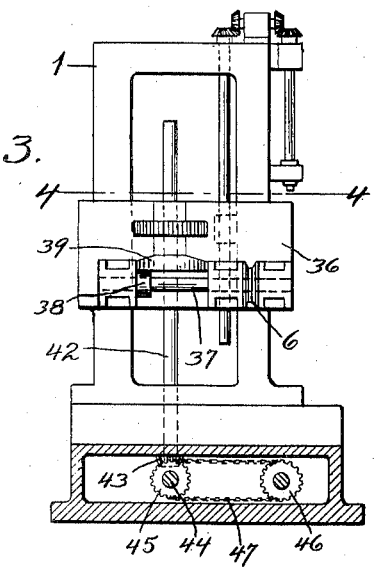
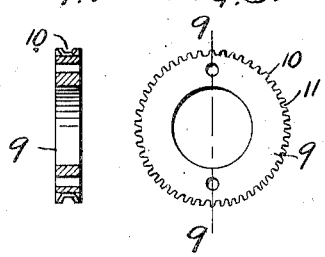
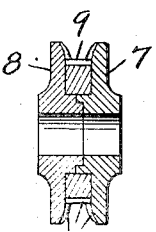
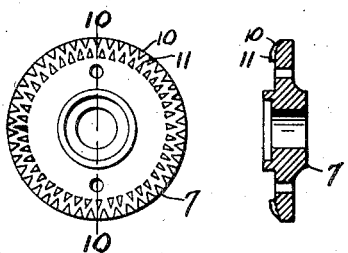
Inventor,
Jabez P. Kemp.
BY William W. Varney, ATTORNEY

UNITED STATES PATENT OFFICE.

JABEZ P. KEMP, OF BALTIMORE, MARYLAND.

PROCESS OF DRESSING OR RE-FORMING GRINDING SURFACES.

Application filed April 21, 1921. Serial No. 463,286.

*To all whom it may concern:*

Be it known that I, JABEZ P. KEMP, a citizen of the United States, residing at Baltimore city, in the State of Maryland, have invented a new and useful Improvement in Processes of Dressing or Re-Forming Grinding Surfaces, of which the following is a specification.

This invention relates to the process of dressing or re-forming grinding surfaces by means of a local crushing process slightly and rapidly inflicted; and has for its object the truing or re-forming of grinding surfaces to exact requirement.

In the present state of the art, grinding wheels, surfaces or other abrasive or cutting bodies are formed, trued or shaped by cutting with a diamond or other abrasive or cutting means, or by means of dressing wheels which operate to tear the particles of the grinding surface from their bonding, leaving a rough untrue surface, and the dressing wheels used in this old process are more or less destroyed in their use.

In my new process of rapidly crushing the particles on the exterior of the surface until the desired shape is obtained, I avoid the difficulties encountered in the old process and obtain a truer and smoother grinding surface.

My invention consists of the novel process and method of dressing or re-forming grinding surfaces as hereinafter described and may be practised in a machine suitable for such work. Such a machine is illustrated in the accompanying drawings, but it is understood that changes, variations and modifications may be resorted to which come within the scope of the claims hereunto appended.

The particular dresser for performing my process in the machine shown in the drawings is a wheel to shape the grinding surface of a grinding wheel to grind involute gear teeth, but I wish it distinctly understood that the dresser may be of any shape desired and need not be a wheel, as it may be a disc, flat bar or surface or any desired form to come in contact with a grinding surface to crush the particles thereof for dressing or forming purposes.

In this specification and claims, when I use the term dressing, I mean truing, forming or otherwise operating to produce a desired given surface.

In order that my process may be more fully understood, I would refer to the accompanying drawings, in which a machine is shown suitable to carry out my improved process as one method of accomplishing the same, but I do not wish to be limited by said drawings, as other machines of vastly different construction and design are equally suitable for the carrying on of my new process.

Figure 1:
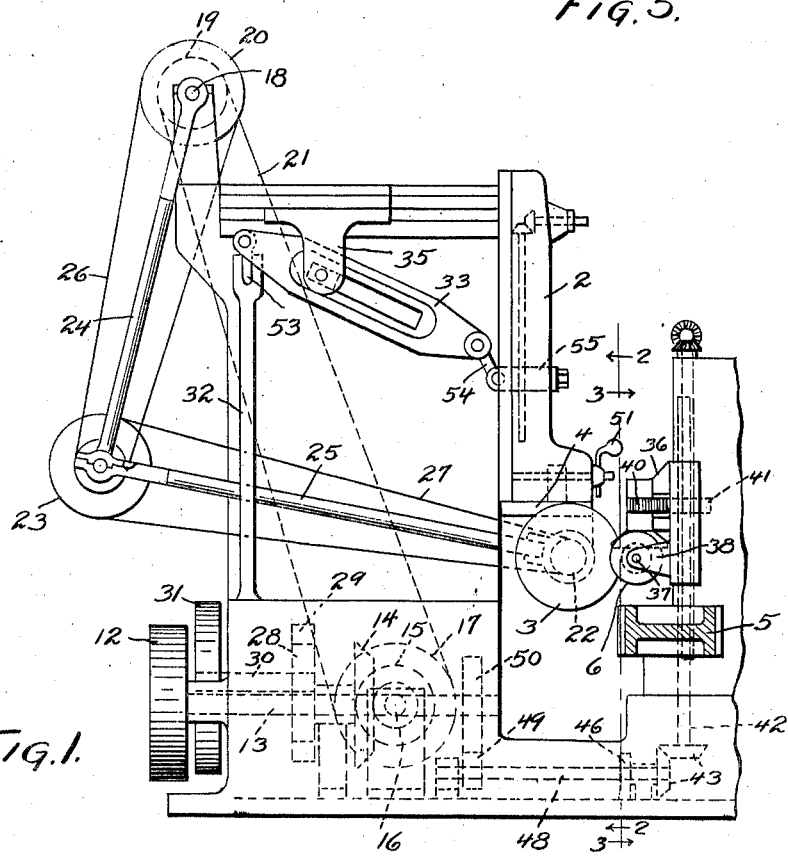

In the accompanying drawings, Figure 1 is a side view in elevation of a grinding machine for general work, such as the grinding of gear teeth or other shapes equipped to dress the grinding wheel by my new process; Fig. 2, is a sectional view in elevation taken at right angles to that shown in Fig. 1 through 2—2 looking towards the grinding wheel to be dressed; Fig. 3, is a sectional view in elevation taken at right angles to that shown in Fig. 1 through 3—3 looking in the opposite direction to that shown in Fig. 2 and showing the dressing wheel; Fig. 4 is a sectional view taken through 4—4 of Fig. 3 looking down. Fig. 5 is a plan view of the machine shown in Fig. 1; Fig. 6 is an enlarged sectional view taken through the dressing wheel as made up of its component parts; Fig. 7, is an enlarged face view of a side dresser of the dressing wheel; Fig. 8, is an enlarged side view of an intermediate dresser of the dressing wheel; Fig. 9, is a sectional view taken through 9—9 of Fig. 8, and Fig. 10, is a sectional view taken through 10—10 of Fig. 7.

Similar numerals refer to similar parts throughout the several views.

1 is the main frame. 2 is the head sliding on main frame 1 and is operated in rectilinear motion by suitable mechanism. 3 is the grinding wheel which is dressed by my improved process and which is mounted on adjusting block 4, slidable on head 2.

Work to be operated upon, such as a gear tooth 5 is cut by rotating grinding wheel 3 on the reciprocating motion of head 2 carrying said grinding wheel. Said griding wheel is fed slightly towards the work when it is desired to have the same dressed by dresser 6 after it has completed a cut in work 5. Dresser 6 is set in alignment with the work operated upon and dresses grinding wheel 3 by crushing and loosening the particles thereof. The feeding of the grinding wheel 3 is accomplished by moving block 4.

6 is the dressing wheel which may be a one piece wheel or for the convenience of construction may be an assembly of parts.

In the drawings it consists of two side dressers 7 and 8 and an intermediate dresser 9. The dressing surfaces of these dressers are smooth hardened surfaces 10 with intervening clearance spaces 11 to carry off the products from dressing.

The dressing wheel 6 is operated by power preferably, so that its pitch line speed shall be approximately the same speed as the pitch line speed of the grinding wheel or other shape dressed, it being desirable to have as little difference of speed or surface travel of the two surfaces as possible, as difference of speed has a tendency to cut the dresser, whereas, the same speed of surfaces simply causes a crushing and loosening.

For a better understanding of the machine in which my process may be practised as described herein, I will describe the power leads operating the grinding wheel and dresser; other parts of the machine, such as means for handling the work, changing its position, automatic feeding of head 4 and much of the detail concerning the adjustment of the machine are omitted as forming no part of my process as claimed herein.

12 is the main driving pulley which operates shaft 13. On shaft 13 is bevel gear 14, which gear 14 operates bevel pinion 15. Bevel pinion 15 is secured to shaft 16 on which shaft is pulley 17. 18 is a shaft carrying pulleys 19 and 20. Pulleys 17 and 19 are connected by belt 21.

The grinding wheel 3 is driven by pulley 22, said wheel and pulley are mounted on block 4 and are driven by pulley 20 by means of intermediate step pulley 23 mounted on swinging arms 24 and 25 and belts 26 and 27.

Head 2 is operated from main driving pulley 12 through shaft 13, gear 28, gear 29, shaft 30, groove cam 31, which cam operates connecting rod 32, link 53, variable lever 33, link 54 and adjusting collar 55. The fulcrum of lever 33 is carried by sliding fulcrum carrier 35, the adjustment of which may be made by any well known means and as required to vary the stroke of head 2 as desired.

The dressing wheel 6 is mounted on shaft 37 which operates in sliding head 36, which head may be adjusted to accommodate any desired stroke and position of grinding wheel 3 on head 2. On shaft 37 is friction wheel 38 which is driven by friction disc 39, and may be adjusted to suit the adjustment of the desired speed of the dressing wheel 6. Said disc 39 is operated by pinion 40 driven by gear 41 operated by spline shaft 42, which shaft is driven by miter gears 43, shaft 44, chain gears 45 and 46 and chain 47. Chain gear 46 is secured to shaft 48, which shaft is driven by pinion 49 and gear 50. Gear 50 is secured to main shaft 13.

51 is a feed screw for adjusting block 4. 52 is a feed for adjusting collar 55 to position the head 2 with relation to the work.

The operation of the machine is as follows—

Work 5 is placed in the machine in a suitable position to be operated upon. Sliding fulcrum carrier 35 is adjusted to give the proper stroke of head 2 to carry the grinding wheel 3 through or by dresser wheel 6 and work 5 to be operated upon. This gives the limit of stroke. The position of stroke as required by working conditions is adjusted by collar 55 and the position of the dresser wheel 6 is adjusted relatively by head 36. The work being adjusted in alignment with dresser wheel 6 as that wheel determines the finished form of the work. The grinding wheel 3 being fed towards dresser wheel 6 after finishing its cut. The feeding may be very slight and regulated automatically by means not shown and it may be optional as to time and amount of feeding.

The operating surfaces 10 of dresser wheel 6 are made of suitable material and hardness and in practice do not show appreciable wear or change of shape to effect their practicability when driven at about approximately pitch line linear speed of the grinding wheel which they form, they simply crush or loosen the particles.

In the machine shown, both grinding wheel 3 and dresser 6 are run at high speed and a relative feeding between the two is regulated to meet the requirements of the wear of the grinding wheel.

Having thus described my invention, what I claim and desire to secure by Letters Patent is—

1. The process of dressing a grinding wheel to be used in accurate formation of irregular surfaces consisting of contacting with said grinding wheel while operating at its grinding speed a circular dressing medium positively operated at substantially the same mean speed of the overlapping surfaces.

2. The process of dressing a grinding wheel to be used in accurate formation of irregular surfaces consisting of contacting with said grinding wheel while operating at its grinding speed a circular dressing medium positively operated at substantially the same mean speed of the overlapping surfaces, said dressing medium consisting of alternate surfaces and clearance spaces the surfaces forming in the aggregate the cross-sectional form desired that the grinding wheel shall be.

3. The process of dressing a grinding wheel while operating at its correct grinding speed to be used in accurate formation of irregular surfaces consisting of contacting with said grinding wheel a crushing surface conjugate to that which the wheel is desired to be and the relative travel of said surfaces being substantially the mean speed of the over-lapping surfaces.

4. The process of dressing or shaping a grinding surface of irregular cross-sectional peripheral form consisting of positively rolling thereon a plurality of surfaces the envelope of which has the conjugate peripheral cross-sectional form as the desired cross-sectional peripheral form of the grinding wheel.

5. The process of dressing or shaping a grinding surface to a predetermined irregular shape consisting of crushing the particles and bond holding said particles of said surface to an amount to produce such irregular dressing or shaping desired by pressing against said particles and bond a plurality of surfaces the envelope of which has the conjugate peripheral cross-sectional form as the desired cross-sectional peripheral form of the grinding wheel to crush the same and remove the dust from said wheel through the spaces between said surfaces.

6. The dressing of a grinding surface to a desired predetermined shape by rapidly and repeatedly hitting the particles of said surface with surfaces provided with clearance means between the same and in the aggregate forming the cross-sectional peripheral conjugate shape desired that the grinding surface shall be and positively relatively operating in a fixed and predetermined path.

JABEZ P. KEMP.

Witnesses:
 CHARLES W. WISNER,
 B. L. WOLFSON.